Nov. 28, 1939.　　　D. K. TRESSLER　　　2,181,838
WINE PROCESS
Filed Aug. 20, 1938
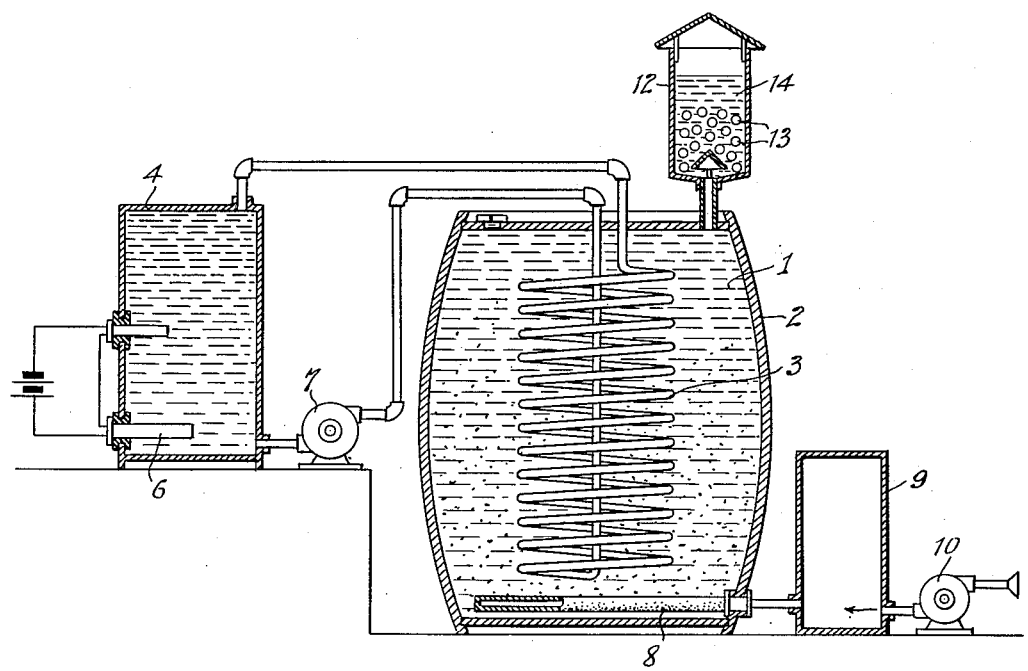
INVENTOR.
Donald K. Tressler
BY
Robert V. Morse
ATTORNEY.

Patented Nov. 28, 1939

2,181,838

UNITED STATES PATENT OFFICE 2,181,838

WINE PROCESS

Donald K. Tressler, Geneva, N. Y., assignor to Cornell Research Foundation, Inc., Ithaca, N. Y., a corporation of New York Application August 20, 1938, Serial No. 225,896

2 Claims. (Cl. 99—35)

This invention relates to certain improvements in the manufacture of wines of high quality such as port, Madeira, Burgundy, etc., and has for its general object a rapid reduction in red color and elimination of foxiness and other off odors and flavors so that these wines may be produced more quickly and at less expense.

In Portugal tawny port is produced by the fermentation on the skins or of the musts of certain red grapes. This freshly fermented wine is of bright red color and has a rather harsh taste. By holding the wine which has been fortified with grape brandy for many years, the bright red color and harsh taste gradually are eliminated and a tawny wine is produced. In order to hasten the elimination of the red color and the harsh flavor, the wine is sometimes shipped in casks at sea for long distances. The constant rolling of the vessel causes the bright red color and harsh flavor to be gradually dissipated. Such a procedure is obviously costly since a considerable proportion of the wine is gradually lost because of evaporation through the pores of the wood.

In New York State port and other red wines are usually prepared by blending wines made from highly colored grapes such as the Clinton and the Ives with wine from less highly colored grapes. Even though the wine is blended in this way, a brilliantly red or "ruby" wine is usually obtained. Usually small amounts of wine prepared from Concord and other foxy grapes are used in the blend, but in this case the product is definitely inferior in flavor and aroma.

I have discovered a process of preparing excellent wines devoid of foxiness from Concord and other species of grapes containing "Labrusca blood." By my process the strong foxy flavor and odor and also the bright red color may be eliminated in a relatively short time thus producing lighter colored wines of high quality in a relatively short time. From a commercial viewpoint this process is especially advantageous since the best wine grapes, which are free from foxiness, cost two or three times as much as do Concord and other foxy grapes. The foxiness is eliminated first, then the color starts to go, and in some cases it is desirable to only eliminate foxiness and leave the bright red color.

I accomplish this new result by maintaining a very intimate contact of air or oxygen while maintaining the wine at temperatures slightly elevated above the usual summer temperatures. I use extremely fine bubbles obtained by forcing air or oxygen through a substantially solid, porous material such as an Alundum tube and simultaneously maintain the wine at a temperature of 90 to 135° F.

Taking up now one specific example of the process for purposes of illustration, reference is made to the drawing, in which the single figure is a general schematic view, showing the elements usually employed.

Referring now to the drawing, the stock 1 to be treated is placed in the container 2, where it is maintained at about 128° F., by means of a steam or hot water coil 3, which is connected to a hot water tank 4. The water in the tank 4 is maintained at the desired temperature by any suitable means such as a thermostatically controlled immersion heater 6, and the heated water is circulated in the coil 3 by a pump 7 or other suitable device. Air is introduced into the heated wine in the container 2 in the form of a very large number of minute bubbles, by forcing air under a few pounds pressure through an Alundum or unglazed porcelain tube 8. This diffuser 8 may be of any substantially solid material of a porous nature, such as unglazed porcelain, solid charcoal, porous rubber, porous copper, or other porous metal. Since the pores of such materials are very minute, the air passing into the wine enters it in the form of extremely fine bubbles, and thus a small volume of air possesses a large surface in contact with the wine and the chance for oxidation is greatly increased.

The air is pumped into the diffuser 8 at a few pounds pressure from the air tank 9 by means of the air pump 10. The air leaving the top of the cask or container 2 carries in the form of vapour considerable alcohol and esters, and a trap 12 is provided to recover them and return them to the wine. This trap 12 contains some glass balls 13 and some wine 14. The vapours are condensed in the relatively cool wine 14, which with the slight variations in pressure that occur from time to time, works its way back into the container 2.

By the process described involving the action of minute bubbles at a temperature slightly elevated above the ordinary room temperature, the foxy flavor of fortified Concord wine disappears in two weeks or less and the wine simultaneously loses its red or purple color and takes on a tawny or deep amber character. The wine is then cooled, filtered and cleared in the usual manner.

The warmer the wine the more rapidly the foxiness and red color are eliminated. If air is used in place of oxygen, approximately a half longer time is required to produce a given effect.

I have found that to remove foxiness without eliminating more than one-third to one-half of the red color, treatment at 128° F. with minute bubbles of oxygen for three days or with minute bubbles of air for four and one-half days is required. To produce a tawny port from a fortified ruby wine with simultaneous removal of foxiness and other off flavors, treatment of the wine at 128° F. with minute bubbles of oxygen for eight days or minute bubbles of air for twelve days is required. If a lower temperature, e. g., 114° F., is employed for converting ruby wine into tawny port, fourteen days' treatment with oxygen or twenty-one days with air is required. Inasmuch as in any case oxygen is the active agent and is present in air in uncombined form, it will be understood that the term "oxygen" in the claims means free oxygen in whatever form.

While my preferred temperature for reducing the red color and eliminating the foxiness is about 128° F., or between 120 and 130° F., I have found that the same action may be obtained as low as 90° F. and as high as 150° F. However, if temperatures above 135° F. are employed, the fortified wine soon takes on a sherry flavor and therefore these higher temperatures can only be used for comparatively short periods of time, and do not give so complete an effect. For this reason a temperature in the vicinity of 128° F. is preferred. This process makes possible the substantial elimination of the foxiness and bright red color without obtaining a sherry flavor.

The manufacture of sherry is described in my copending application Ser. No. 106,502, and in general requires higher temperatures for several weeks time.

While the process is particularly useful with Labrusca type grapes, due to their cheapness, high quality grapes can also be used if desired. It will be understood that the foregoing specific examples are merely for purposes of illustration, to make clear the principles of the process, and that the invention is subject to various modifications and adaptations in different installations as will be apparent to those skilled in the art without departing from the scope of the following claims.

I claim:

1. A wine making process which consists in taking wine stock including wine made from grapes of Labrusca blood, having a bright red color and foxy flavor, heating it substantially above room temperature but below 150° F., simultaneously passing through the heated stock large quantities of minute bubbles containing oxygen, and regulating the combined effect of time and temperature so that the oxygen treatment is terminated before the stock develops a sherry flavor, whereby the foxiness is eliminated and the color changed from red to tawny.

2. A wine making process which consists in taking wine stock including wine made from grapes of Labrusca blood having a bright red color and foxy flavor, heating it to approximately 110° to 130° F., simultaneously passing through the heated stock large quantities of minute bubbles containing oxygen, and regulating the combined effect of time and temperature so that the oxygen treatment is terminated before the stock develops a sherry flavor, whereby the foxiness is eliminated and the color changed from red to tawny.

DONALD K. TRESSLER.